J. H. FULLINGTON.
WRIST PIN.
APPLICATION FILED JUNE 12, 1920.
1,384,186.
Patented July 12, 1921.
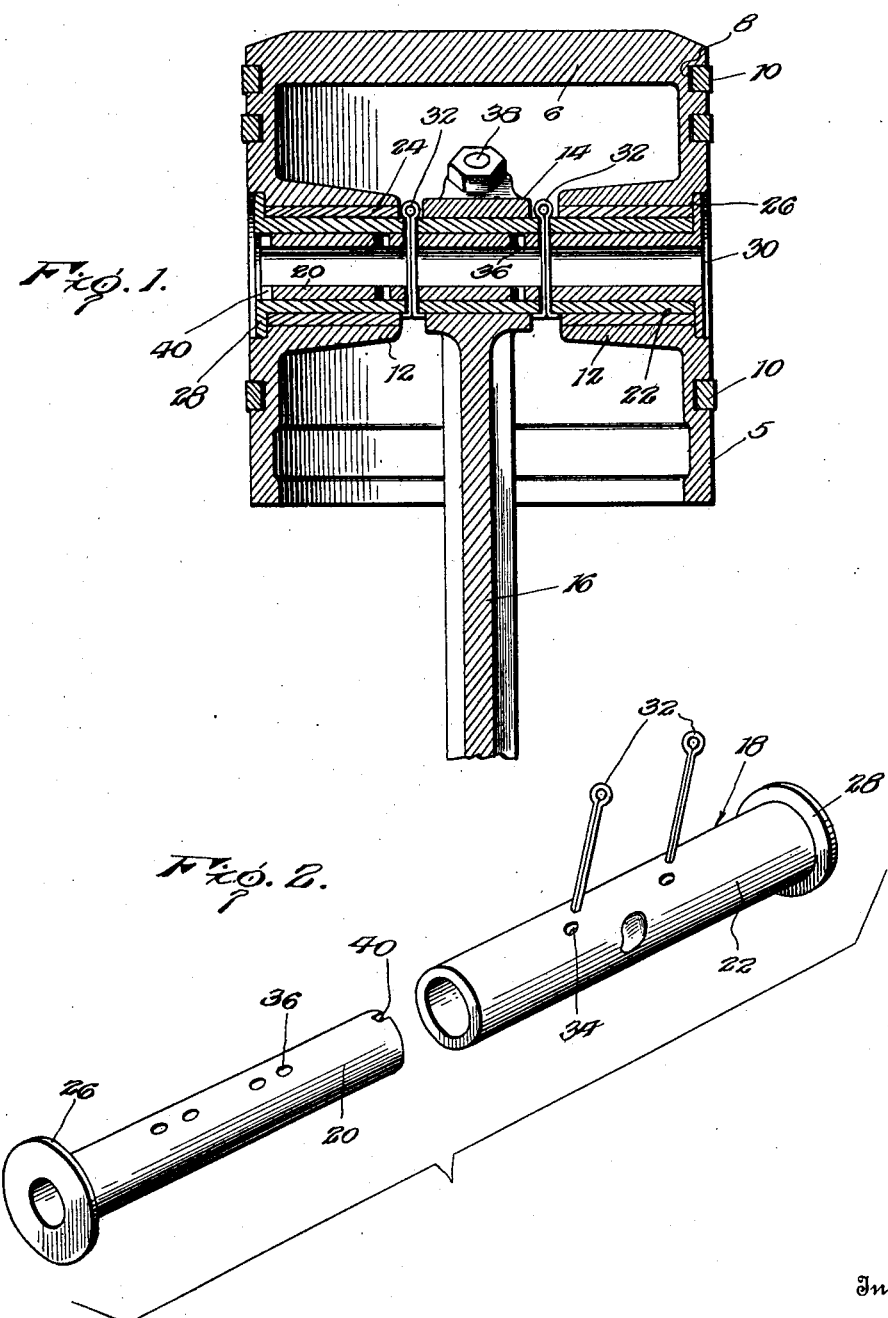

UNITED STATES PATENT OFFICE.

JOHN H. FULLINGTON, OF HUNTSVILLE, ALABAMA, ASSIGNOR OF ONE-HALF TO ISADORE WIND, OF HUNTSVILLE, ALABAMA.

WRIST-PIN.

1,384,186.      Specification of Letters Patent.      Patented July 12, 1921.

Application filed June 12, 1920. Serial No. 388,557.

*To all whom it may concern:*

Be it known that I, JOHN H. FULLINGTON, citizen of the United States, residing at Huntsville, in the county of Madison and State of Alabama, have invented certain new and useful Improvements in Wrist-Pins, of which the following is a specification.

This invention relates to improvements in pistons especially adapted for use on internal combustion engines.

An important object of this invention is to provide a piston having a novel form of wrist pin provided with novel means whereby the same may be detachably connected to the piston in such a manner that scoring of the cylinder in which the piston is arranged is prevented.

A further object of the invention is to provide a piston having a wrist pin which may be readily and conveniently adjusted for use on pistons of various widths.

A further object of the invention is to provide a piston having a wrist pin provided with novel means for securing the connecting rod attached to the same against undue transverse movement.

A further object of the invention is to provide a piston of the class described which is of highly simplified construction, durable in use, and cheap to manufacture.

Other objects and advantages of the invention will be apparent during the course of the following description.

In the accompanying drawings forming a part of this application and in which like numerals are employed to designate like parts throughout the same, Figure 1 is a central vertical section through a piston having the improved wrist pin connected thereto, Fig. 2 is a group perspective of the improved wrist pin.

In the drawing, wherein for the purpose of illustration is shown a preferred embodiment of the invention, the numeral 6 generally designates a piston having its upper end closed as usual for receiving power impulses resulting from the expansion of the gases within the combustion chambers. In accordance with the standard construction the piston is provided with a plurality of annular grooves 8 within which piston rings 10 of any desired type are arranged so as to provide a gas-tight connection between the piston and the side walls of the cylinder.

As illustrated in Fig. 1, the piston is formed with a pair of inwardly extending alined bosses 12 which have their inner ends arranged in spaced relation so as to allow the upper head 14 of a connecting rod 16 to be positioned between the bosses and in line with the same.

The means employed for connecting the piston to the connecting rod comprises a wrist pin generally designated by the numeral 18 and which includes inner and outer interfitting sleeve sections 20 and 22.

The outer sleeve or section 22 of the wrist pin is adapted to be extended through alined bushings 24 which, as illustrated in Fig. 1, are snugly arranged within the several bosses 12. However, preparatory to extending the outer section 22 through the bushings 24, the bearing 14 of the connecting rod is alined with the bushings so that the outer section 22 will also be extended through the bearing 14. Upon inserting the outer section 22 through the alined bushings 24, the inner section 20 is inserted from the other side of the piston into the outer section 22. The rear end portions of the inner and outer interfitting sections 20 and 22 are formed with annular laterally projecting flanges 26 and 28 respectively which engage the inner walls of counterbored portions 30 in opposite sides of the piston. As clearly illustrated in Fig. 1, the laterally projecting flanges 26 and 28 are arranged inwardly of the surface of the piston so that the cylinder wall will not be scored as the result of contact with the rear ends of the sections.

The inner and outer sections 20 and 22 may be adjustably connected through the medium of locking devices 32 which, as illustrated in Fig. 2, are in the form of cotter keys. The outer section 22 is formed with pairs of alined transverse openings 34 which are adapted to be selectively alined with pairs of alined openings 36 in the inner section 20 so as to permit of the insertion of the locking devices 32 through the pairs of openings 34 and 36. This connecting of the parts takes place, of course, after the bearing 14 has been connected to the outer section 22 through the medium of a set screw 38 which securely clamps the bearing 14 to the outer section.

In addition to adjustably connecting the inner and outer sections of wrist pin, the locking devices 32 provide a means for preventing undue lateral movement of the connecting rod with relation to the wrist pin. The inner section 20 is provided at one end with a pair of transverse grooves 40 which are adapted to receive the forward portion of a screw driver or other suitable tool so that the inner section may be rotated to aline the transverse openings 36 of the same with the transverse openings 34 in the outer section preparatory to the insertion of the locking devices 32.

In the use of the improved piston and wrist pin, the lengths of the same may be readily and conveniently adjusted so as to fit pistons of various widths. If desired, the inner section may be formed with an increased number of alined openings 36 so as to increase the range of adjustment.

In carrying out the invention, the connecting rod may, if desired, be rotatably connected to the sectional wrist pin and the wrist pin may be rigidly connected to the inwardly extending alined bosses 12.

It is to be understood that the form of the invention herewith shown and described is to be taken as a preferred example of the same and that such minor changes in arrangement and construction of parts may be made as will remain within the spirit of the present invention and the scope of what is claimed.

Having thus described the invention, what is claimed as new is:

1. The combination with a piston having bosses, of a wrist pin fitted through said bosses and inclusive of inner and outer interfitting sections, and means for adjustably connecting said sections, and constituting a stop element for a rod adapted for connection with the pin.

2. The combination with a piston having inwardly extending bosses, of a wrist pin extending through said bosses and including interfitting inner and outer sections, a rod having connection with said wrist pin, and means adjustably connecting the sections of said wrist pin and securing said rod against transverse movement.

3. The combination with a piston, of inner and outer interfitting sections extending through said piston and provided with pairs of alined openings, a connecting rod having a bearing receiving said sections, and means adjustably connecting said sections and extending through said openings, said means being adapted for limiting the transverse movement of the bearing of said rod.

4. The combination with a piston having inwardly extending bosses provided with bushings, of a wrist pin inclusive of inner and outer sections extending through said bushings, said piston being provided with counterbored portions, means adjustably connecting the inner and outer sections of said wrist pin, said wrist pin being provided with annular flanges seating in the counterbored portion of said piston, and a connecting rod secured to said wrist pin and confined between means for adjustably connecting said inner and outer sections.

5. The combination with a piston, of a wrist pin extending therethrough and including inner and outer sections, a rod having connection with said wrist pin, and means adjustably connecting the sections of said wrist pin and holding said rod against lateral movement.

In testimony whereof I affix my signature.

JOHN H. FULLINGTON. [L. S.]